United States Patent
Nakamura et al.

(10) Patent No.: US 6,654,177 B2
(45) Date of Patent: Nov. 25, 2003

(54) VEHICLE-USE HEAD-UP DISPLAY SYSTEM

(75) Inventors: Go Nakamura, Shizuoka (JP); Kunimitsu Aoki, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/171,617

(22) Filed: Jun. 17, 2002

(65) Prior Publication Data

US 2003/0021043 A1 Jan. 30, 2003

(30) Foreign Application Priority Data

Jul. 26, 2001 (JP) ..................... 2001-225772

(51) Int. Cl.$^7$ .................................. G02B 27/14
(52) U.S. Cl. ......................... 359/632; 359/630
(58) Field of Search ................. 359/630, 631, 359/633, 822; 345/7, 8

(56) References Cited

U.S. PATENT DOCUMENTS

| | | | |
|---|---|---|---|
| 3,552,828 A | * 1/1971 | E. G. Lawrence et al. | 359/632 |
| 3,802,764 A | * 4/1974 | Ellis | 359/630 |
| 5,237,455 A | * 8/1993 | Bordo et al. | 359/632 |
| 5,381,267 A | * 1/1995 | Woody | 359/632 |
| 5,386,216 A | * 1/1995 | Iino | 345/7 |
| 5,394,203 A | * 2/1995 | Murphy et al. | 353/13 |
| 5,457,575 A | * 10/1995 | Groves et al. | 359/631 |
| 5,506,595 A | * 4/1996 | Fukano et al. | 345/7 |
| 5,677,701 A | * 10/1997 | Okuyama et al. | 345/7 |
| 6,012,785 A | * 1/2000 | Kawasaki | 312/29 |

FOREIGN PATENT DOCUMENTS

| | | |
|---|---|---|
| JP | 5-229366 | 9/1973 |
| JP | 7-257228 | 10/1995 |

* cited by examiner

*Primary Examiner*—Ricky Mack
(74) *Attorney, Agent, or Firm*—Armstrong, Westerman & Hattori, LLP

(57) ABSTRACT

A vehicle-use head-up display system is provided, which has: a luminous display unit to display an image including information about a vehicle; a reflecting means to reflect light of the display-image of the luminous display unit; a translucent reflecting means arranged on a windshield ahead of a driver's seat, reflecting the light of the display-image from the reflecting means, and having a driver look at a virtual image on the windshield; a moving means to linearly move the reflecting means in a back-and-forth direction of the vehicle; and a display-image moving means to upwardly move the display-image of the luminous display unit in accordance with a backward movement of the reflecting means by the moving means and to downwardly move the display-image of the luminous display unit in accordance with a forward movement of the reflecting means by the moving means, wherein a display position is adjusted such that a depression angle does not change when an eye point in an eye range changes.

6 Claims, 2 Drawing Sheets

VEHICLE-USE HEAD-UP DISPLAY SYSTEM

BACKGROUND OF THE INVENTION

1. Field of the Invention

The present invention relates to a vehicle-use head-up display system which reflects the light of a display-image of a luminous display unit capable of displaying an image including information about a vehicle toward a translucent reflecting means arranged in a visual field ahead of a driver's seat by means of a reflecting means so that a driver can look at a virtual image in front of a windshield of a vehicle, wherein a display position of the virtual image can be adjusted in a state that a depression angle does not change even if an eye point of the driver changes within an eye range.

2. Description of the Related Art

As an example, there is a prior art system with a structure shown in FIG. 6. In this figure, a luminous display unit 111 having a fluorescent display tube, a liquid crystal or the like is arranged in a non-shown dashboard with its display surface directed toward the front of a vehicle. A reflecting mirror 113 to reflect the light of the display-image of this display unit 111 is arranged with a fixed angle relative to the display surface of the display unit 111. Here, though not illustrate, the light of the display-image of the display unit 111 can be projected on the reflecting mirror 113 through the Fresnel lens being an expansion optical system.

And, the reflecting mirror 113 reflects the light of the display-image of the display unit 111 toward an inner surface of a windshield (a front glass) 20 of the vehicle through an opening of a non-shown dashboard top face. On the inner surface, on the cabin side, of the windshield 20, a translucent reflection coating 21 to reflect the display-image reflected by the reflecting mirror 113 in a sight line direction of a driver is formed. By this, a driver can look at the display-image of the display unit reflected by the reflecting mirror 113 and the translucent reflection coating 21 as a virtual image ahead of the windshield.

Here, though not illustrate, the luminous display unit 111 and the reflecting mirror 113 are accommodated in a casing. Reference numerals 30 and 31 denote eye points and an eye range.

The eye range 30 defines a range or scope from which the display, i.e. the image, reflected by the translucent reflection coating 21 shall be looked at.

In order to assure a driver, i.e. the eye point, to be able to look at the display from the whole eye range, an adjusting mechanism to adjust the position of the display-image is provided on the system. When the eye points of a driver vertically move in the eye range for example, the adjusting mechanism linearly moves the reflecting mirror 113 as shown and turns the reflecting mirror 113 also as shown so that a depression angle can be unchanged.

With respect to the above prior art the adjusting mechanism, however, the turning adjustment of the reflecting mirror 113 is very difficult because a difference of angle, i.e. the difference between angles α and β, is very small when the windshield stands nearly vertically like a truck.

SUMMARY OF THE INVENTION

In view of the foregoing, an object of the present invention is to provide a head-up display system wherein a positioning adjustment of the display-image can be precisely carried out when the eye points vertically move.

In order to achieve the above object, as a first aspect of the present invention, a vehicle-use head-up display system comprises: a luminous display unit to display an image including information about a vehicle; a reflecting means to reflect light of the display-image of the luminous display unit; a translucent reflecting means arranged on a windshield ahead of a driver's seat, reflecting the light of the display-image from the reflecting means, and having a driver look at a virtual image on the windshield; a moving means to linearly move the reflecting means in a back-and-forth direction of the vehicle; and a display-image moving means to upwardly move the display-image of the luminous display unit in accordance with a backward movement of the reflecting means by the moving means and to downwardly move the display-image of the luminous display unit in accordance with a forward movement of the reflecting means by the moving means, wherein a display position is adjusted such that a depression angle does not change when an eye point in an eye range changes.

According to the above vehicle-use head-up display system, the display-image moving means upwardly moves the display-image of the luminous display unit with the backward movement of the reflecting means, and downwardly moves the display-image of the luminous display unit with the forward movement of the reflecting means, so that the depression angle is not changed by adjusting the display position. Therefore, when looking at the display at a different eye point in the eye range, the display-image only has to be vertically shifted and the reflecting means only has to be linearly-moved in a back-and-forth direction.

As a second aspect of the present invention, based on the first aspect, the display-image moving means is a display unit moving means to vertically move the luminous display unit.

According to the above vehicle-use head-up display system, the luminous display unit only has to be vertically moved in accordance with the back-and-forth movement of the reflecting means.

As a third aspect of the present invention, based on the second aspect, the display unit moving means has a display inclining means to incline a display surface of the luminous display unit in such a manner that an optical axis of the luminous display unit is unchanged when the luminous display unit is vertically moved.

According to the above vehicle-use head-up display system, the image to be looked at does not change when the eye points moves in the eye range.

As a fourth aspect of the present invention, based on the second aspect, the display unit moving means has a driving device to drive the luminous display unit and a guiding means, of an arcuate groove, to vertically guide the luminous display unit driven by the driving device and to incline a display surface of the luminous display unit in such a manner that an optical axis of the luminous display unit is unchanged when the luminous display unit is vertically moved.

According to the vehicle-use head-up display system, the image to be looked at does not change when the eye points moves in the eye range.

As a fifth aspect of the present invention, based on the second aspect, the display unit moving means has a driving device to drive the luminous display unit and a guiding means to vertically linearly guide the luminous display unit driven by the driving device.

According to the vehicle-use head-up display system, the display position can be adjusted without changing the depression angle.

As a sixth aspect of the present invention, based on the first aspect, the display-image moving means is a means to vertically move the display-image on the display surface of the luminous display unit.

According to the vehicle-use head-up display system, the luminous display unit does not need to be mechanically moved.

The above and other objects and features of the present invention will become more apparent from the following description taken in conjunction with the accompanying drawings.

DESCRIPTION OF THE PREFERRED EMBODIMENT(S)

Embodiment(s) of the present invention will now be described in further detail with reference to the accompanying drawings.

Figure 1:
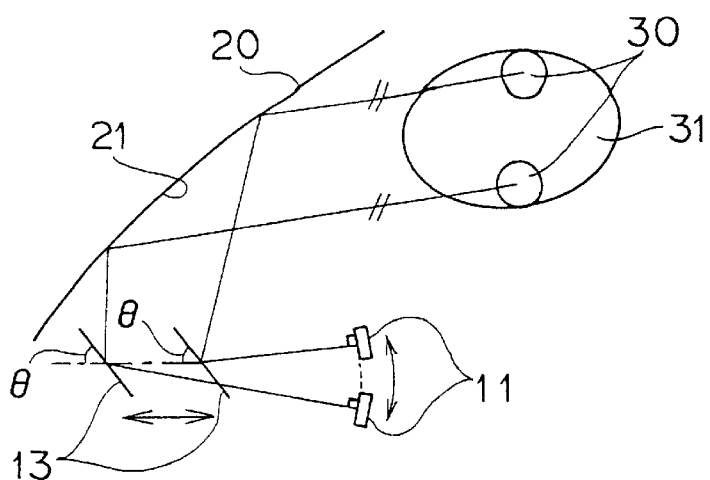
FIG. 1 is a side view showing an embodiment of the inventive vehicle-use head-up display system.

FIG. 1 is a side view showing an embodiment of the inventive vehicle-use head-up display system. In this figure, a luminous display unit 11 having a fluorescent display tube, a liquid crystal or the like is arranged in a non-shown dashboard with its display surface directed toward the front of a vehicle. A reflecting mirror 13 to reflect the light of the display-image of this display unit 11 is arranged with a fixed angle relative to the display surface of the display unit 11.

And, the reflecting mirror 13 reflects the light of the display-image of the display unit 11 toward an inner surface of a windshield (a front glass) 20 of the vehicle through an opening of a non-shown dashboard top face. On the inner surface, on the cabin side, of the windshield 20, a translucent reflection coating 21 to reflect the display-image reflected by the reflecting mirror 13 in a sight line direction of a driver is formed.

The mirror 13 reflects the light of the display-image of the luminous display unit toward a reflection surface of the translucent reflection coating 21. By this, a driver can look at the display-image of the display unit reflected by the reflecting mirror 13 and the translucent reflection coating 21 as a virtual image ahead of the windshield.

An adjusting mechanism to adjust the position of the virtual image is provided on the vehicle-use head-up display system of FIG. 1 so that the eye points, when moved within the eye range, can look at the image. The adjusting mechanism has a non-shown mirror moving device as a moving means and a non-shown display-image moving device as a display-image moving means. The mirror moving device linearly-moves the mirror 13 in a back-and-forth direction of a vehicle. The display-image moving device upwardly shifts the display-image of the luminous display unit 11 in accordance with the backward movement of the mirror 13, and downwardly shifts the display-image of the luminous display unit 11 in accordance with the forward movement of the mirror 13.

The above mirror moving device can be made up of a guiding means to guide the mirror 13 to linearly move (θ=constant) in a back-and-forth direction of a vehicle and a driving device to drive the mirror 13. The driving device consists of a screw shaft screwed to the mirror 13 and a motor to normally/reversely-rotate the screw shaft. With the above structure, when the eye points exist at a bottom end position in the eye range, the mirror 13 is shifted to a corresponding front position by rotating the motor. And, when the eye points exist at a top position in the eye range, the mirror 13 is shifted to a corresponding rear position by reversely rotating the motor.

Figure 2:
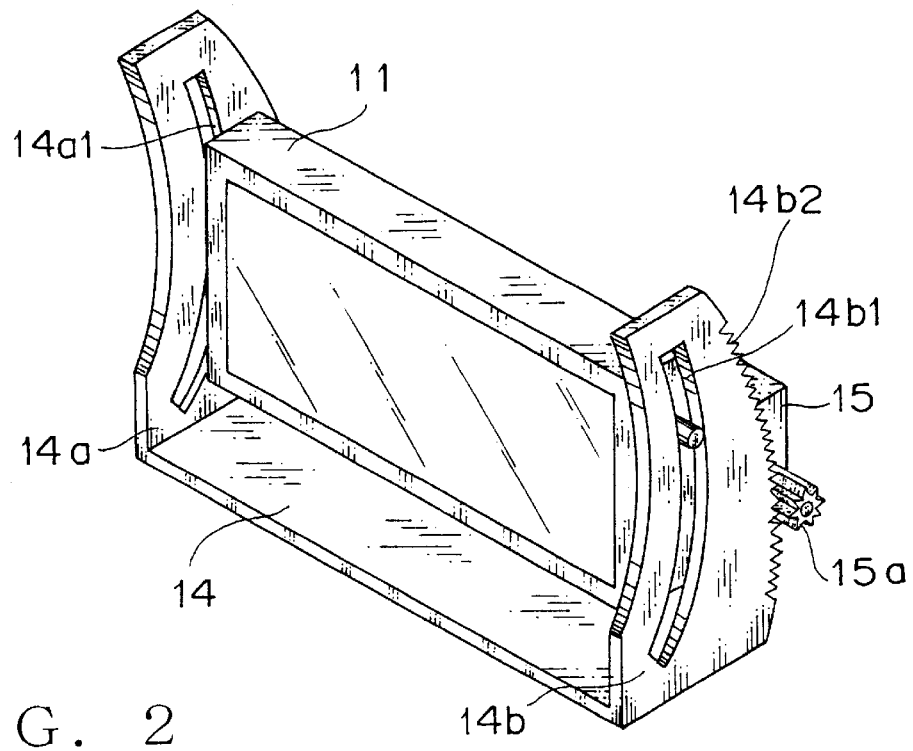
FIG. 2 is a perspective view showing the details of one portion of FIG. 1.
Figure 3:
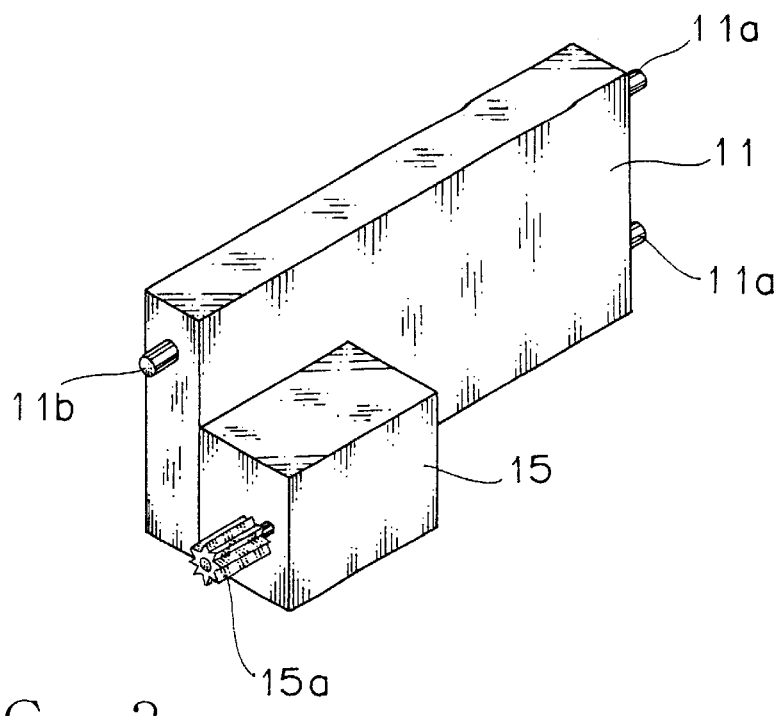
FIG. 3 is a perspective view showing the details of another portion in FIG. 1.

The display-image moving device has a guiding means 14 and a driving device 15. The guiding means 14 arcuately vertically guides the luminous display unit 11 according to the back-and-forth movement of the mirror 13 as shown in FIG. 2 and FIG. 3. With this movement, the luminous display unit 11 performs an inclination movement. The driving device 15 vertically moves the luminous display unit 11.

Specifically, the guiding means 14, as shown in FIG. 2, consists of arcuate grooves 14a1,14b1 formed on respective facing plates 14a,14b of a U-shaped support guide body. Two projections 11a projecting on the left of the luminous display unit 11 engage the arcuate groove 14a1 of one facing plate 14a, and a projection 11b projecting on the right of the luminous display unit 11 engages the arcuate groove 14b1 of the other facing plate 14b. With this, the luminous display unit 11 vertically draws a circular arc locus.

The driving device is a motor unit 15 attached to the back of the luminous display unit 11 as shown in FIG. 2 and FIG. 3. A pinion 15a is attached to an output shaft of the unit 15. The pinion 15a engages a rack 14b2 arcuately formed along the arcuate groove 14b1 on the facing plate 14b. The luminous display unit 11 vertically moves when the motor unit 15 rotates.

Here, though not illustrate, the luminous display unit 11, the mirror 13, and so on are accommodated in a single casing. And, a non-shown operation knob to adjust the display position is provided on an operation surface of the dashboard.

When the operation knob is operated on demand, the driving device works, and the mirror 13 is linearly-moved by the guiding means in a back-and-forth direction of a vehicle. When the pinion 15a is rotated by the motor unit 15 while linking the linear movement of this mirror 13, the luminous display unit 11 is vertically moved while being guided by the arcuate grooves 14a1 and 14b1. And simultaneously, the inclination movement of the luminous display unit 11 is carried out. The arcuate grooves 14a1 and 14b1 acts as a display inclining means which inclines the display surface in such a manner that an optical axis of the luminous display unit 11 is not changed during the vertical movement thereof.

The mirror 13 is linearly-moved in accordance with the movement of the eye points 30 in the eye range 31. When the optical axes of the display surface, the mirror 13 and the eye points 30 are shifted, the optical axis of the display surface keeps the right angle thereto by means of the inclination movement of the luminous display unit 11. Therefore, an inclination of the display-image looked at by a driver is not changed by the eye point position.

However, the inclination movement of the luminous display unit 11 does not need to be executed precisely.

Figure 4:
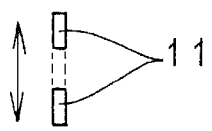
FIG. 4 is a side view showing a modified example of a portion of FIG. 1.
Figure 5:
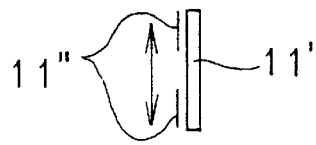
FIG. 5 is a side view showing another modified example of the portion of FIG. 5.
Figure 6:
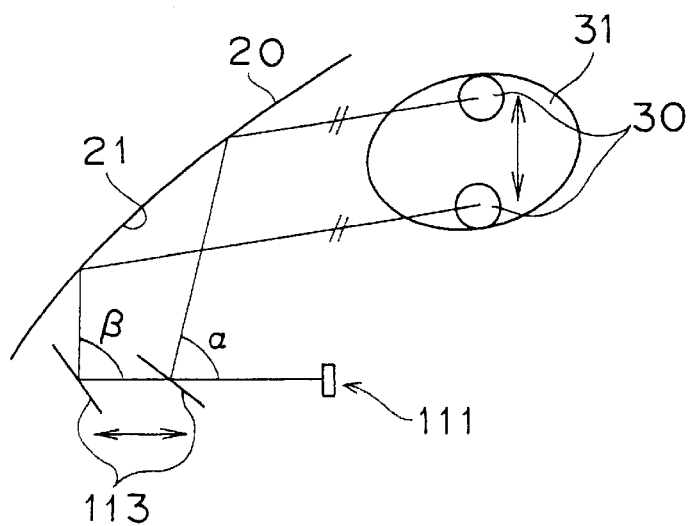
FIG. 6 is a side view showing a prior art vehicle-use head-up display system.

Here, when the angular variation, of the optical axis, against the display surface in accordance with the linear movement of the mirror 13 is not large, the inclination movement of the display unit is not necessary. In this case, the arcuate grooves 14a1, 14b1 of the guiding means shown in FIG. 2 could be linear ones so as to merely vertically move the luminous display unit 11 as shown in FIG. 4, whereby the structure can be simplified. Further, when the inclination movement of the display unit is not necessary, the luminous display unit 11 having a larger display surface can be used. In this case, as shown in FIG. 5, the luminous display unit 11 is fixed, and the display-image is vertically shifted in the display surface, whereby a mechanical driving means to move the display unit is not necessary.

According to the above vehicle-use head-up display system, the display-image moving means upwardly moves the display-image of the luminous display unit with the backward movement of the reflecting means, and downwardly moves the display-image of the luminous display unit with the forward movement of the reflecting means, so that the depression angle is not changed by adjusting the display position. Therefore, when looking at the display at a different eye point in the eye range, the display-image only has to be vertically shifted and the reflecting means only has to be linearly-moved in a back-and-forth direction. Therefore, a position adjustment of the display-image in accordance with the vertical movement of the eye points can be precisely carried out.

According to the above vehicle-use head-up display system, since the luminous display unit is vertically moved in accordance with the back-and-forth movement of the reflecting means, the display-image can be easily vertically moved with a simple structure.

According to the above vehicle-use head-up display system, since the image to be looked at does not change when the eye points moves in the eye range, the display quality can be excellent.

According to the above vehicle-use head-up display system, since the image to be looked at does not change when the eye points moves in the eye range, the display quality can be excellent with the simple structure.

According to the vehicle-use head-up display system, since the display position can be adjusted without changing the depression angle, the display quality can be excellent.

According to the vehicle-use head-up display system, since the luminous display unit does not need to be mechanically moved, the display-image can be easily vertically moved with a simple structure.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A vehicle-use head-up display system, comprising:

a luminous display unit to display an image including information about a vehicle;

a reflecting means to reflect light of the display-image of the luminous display unit;

a translucent reflecting means arranged on a windshield ahead of a driver's seat, reflecting the light of the display-image from the reflecting means, and having a driver look at a virtual image on the windshield;

a moving means to linearly move the reflecting means in a back-and-forth direction of the vehicle; and a display-image moving means to upwardly move the display-image of the luminous display unit in accordance with a backward movement of the reflecting means by the moving means and to downwardly move the display-image of the luminous display unit in accordance with a forward movement of the reflecting means by the moving means, wherein a display position is adjusted such that a depression angle does not change when an eye point in an eye range changes.

2. The vehicle-use head-up display system as set forth in claim 1, wherein the display-image moving means is a display unit moving means to vertically move the luminous display unit.

3. The vehicle-use head-up display system as set forth in claim 2, wherein the display unit moving means has a display inclining means to incline a display surface of the luminous display unit in such a manner that an optical axis of the luminous display unit is unchanged when the luminous display unit is vertically moved.

4. The vehicle-use head-up display system as set forth in claim 2, wherein the display unit moving means has a driving device to drive the luminous display unit and a guiding means, of an arcuate groove, to vertically guide the luminous display unit driven by the driving device and to incline a display surface of the luminous display unit in such a manner that an optical axis of the luminous display unit is unchanged when the luminous display unit is vertically moved.

5. The vehicle-use head-up display system as set forth in claim 2, wherein the display unit moving means has a driving device to drive the luminous display unit and a guiding means to vertically linearly guide the luminous display unit driven by the driving device.

6. The vehicle-use head-up display system as set forth in claim 1, wherein the display-image moving means is a means to vertically move the display-image on the display surface of the luminous display unit.

* * * * *